(12) United States Patent
Miller

(10) Patent No.: US 10,004,175 B1
(45) Date of Patent: Jun. 26, 2018

(54) FERTILIZER APPLICATION

(71) Applicant: John A. Miller, Catlin, IL (US)

(72) Inventor: John A. Miller, Catlin, IL (US)

( * ) Notice: Subject to any disclaimer, the term of this patent is extended or adjusted under 35 U.S.C. 154(b) by 0 days. days.

(21) Appl. No.: 15/470,990

(22) Filed: Mar. 28, 2017

Related U.S. Application Data

(60) Provisional application No. 62/315,073, filed on Mar. 30, 2016.

(51) Int. Cl.
*A01C 21/00* (2006.01)
*A01C 13/00* (2006.01)
*A01C 23/02* (2006.01)

(52) U.S. Cl.
CPC ............ *A01C 21/002* (2013.01); *A01C 13/00* (2013.01); *A01C 21/00* (2013.01); *A01C 23/023* (2013.01); *A01C 23/027* (2013.01)

(58) Field of Classification Search
CPC ....... A01C 21/002; A01C 21/00; A01C 13/00; A01C 23/023; A01C 23/02; A01C 23/00; A01C 23/027
See application file for complete search history.

(56) References Cited

U.S. PATENT DOCUMENTS

| | | | | |
|---|---|---|---|---|
| 2,876,718 A | * | 3/1959 | Vaughan | A01C 23/025 111/121 |
| 5,477,792 A | * | 12/1995 | Bassett | A01B 49/06 111/121 |
| 6,095,065 A | * | 8/2000 | Dietrich, Sr. | A01C 21/002 111/121 |
| 7,739,969 B1 | | 6/2010 | Miller | |

OTHER PUBLICATIONS

360 Y-DROP® Fertilizer Applicator, 360 Yield Center, LLC, Morton, Illinois. Retrieved from Internet URL: www.360yieldcenter.com/products/360-y-drop on Feb. 27, 2017.

* cited by examiner

*Primary Examiner* — Christopher J. Novosad
(74) *Attorney, Agent, or Firm* — Philip L. Bateman

(57) ABSTRACT

Fertilizer is applied between the rows of growing plants or to the bases of growing plants in adjacent rows. A dirt moving member then moves dirt and any applied fertilizer from between the rows onto the bases of the growing plants in the adjacent rows. The dirt acts to seal the fertilizer and to significantly reduce fertilizer losses.

10 Claims, 14 Drawing Sheets

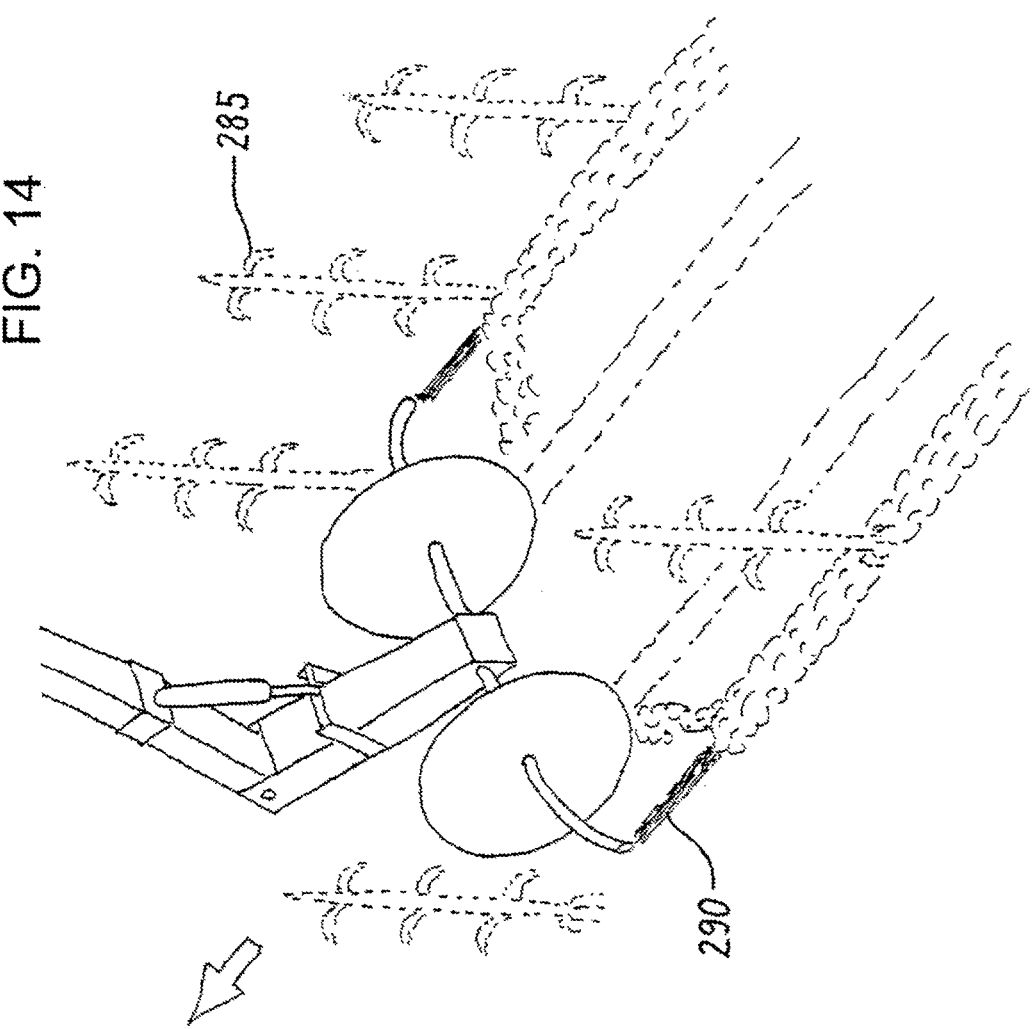

FERTILIZER APPLICATION

CROSS-REFERENCE TO RELATED APPLICATION

This application claims the benefit of U.S. Provisional Application Ser. No. 62/315,073, Mar. 30, 2016.

FIELD OF THE INVENTION

This invention relates to farming. More particularly, this invention relates to the application of fertilizers to growing crops.

BACKGROUND OF THE INVENTION

Sixteen elements are known to be essential for plant growth. Three of the elements (carbon, hydrogen, and oxygen) are provided in large amounts by carbon dioxide in the atmosphere and by water in both the atmosphere and the soil. The other thirteen essential elements are needed in varying amounts and are often added to the soil as fertilizers.

Nitrogen is one of the thirteen essential elements and is needed in relatively large amounts by crops such as corn and soybeans. Although nitrogen in the form of $N_2$ gas makes up almost eighty percent of the gases in earth's atmosphere, plants are unable to use nitrogen gas. Instead, plants are able to use nitrogen only when it is in the form of nitrate ions ($NO_3^-$) that contact their roots in the soil.

Nitrogen is added to fertilize the soil in many different forms. In commercial farming, nitrogen is often added in the form of anhydrous (water free) ammonia ($NH_3$). Ammonia is a gas at ambient temperatures and atmospheric pressure. If applied as a gas, the ammonia would largely dissipate before forming a solution with the water present in the soil. To prevent nearly complete dissipation, anhydrous ammonia must be applied as a liquid. This requires the anhydrous ammonia to be stored in pressurized containers, applied as a liquid into a trench, and then immediately covered with dirt. For many years, it has been common practice for corn and soybean farmers to add nitrogen to the soil once a year in the form of anhydrous ammonia.

In recent years it has been discovered that corn and soybean yields are increased by applying nitrogen to the soil at two different times: (1) before or at planting; and (2) when the plants are midway through their growth season. When the plants are growing, there are problems in applying anhydrous ammonia because a deep trench can damage the root systems of the growing plants. The formation of a deep trench can also hurl large dirt particles that damage the growing plants. Miller, U.S. Pat. No. 7,739,969, Jun. 22, 2010, discloses a side dressing shield that deflects dirt particles from damaging young corn plants. However, many farmers continue to avoid applying anhydrous ammonia to fields containing growing plants.

Nitrogen can be applied to the soil in the form of liquid solutions. Although applying nitrogen as a liquid solution is more expensive than applying as anhydrous ammonia, the liquid solutions can be added without forming a deep trench. Accordingly, it has become common to apply liquid nitrogen solutions to fields containing growing plants. The most common liquid nitrogen solutions contain a combination of urea ($CO(NH_2)_2$) and ammonium nitrate ($NH_4NO_3$) and are known as UAN (urea ammonium nitrate) fertilizers.

Liquid UAN fertilizers are commonly applied with equipment having a single hose between each row of growing plants. The liquid seeps into the ground, the nitrogen gradually converts to the nitrate form, and an effective amount eventually reaches the root systems of the plants.

From the time the UAN fertilizers are poured onto the ground between rows to the time the nitrogen actually reaches the root systems, nitrogen losses occur for four primary reasons. Some of the nitrogen is lost due to volatilization in which the liquid is dispersed into the atmosphere. Some of the nitrogen is lost due to leaching, especially if large rains occur soon after application that physically wash the nitrogen deeper into the ground beyond the root systems. Some of the nitrogen is lost to denitrification in which microbes convert the nitrogen compounds into nitrogen gas that cannot be used by the plants. And some of the nitrogen is lost to immobilization in which the nitrogen is converted to organic compounds that cannot be used by the plants.

While the loss of nitrogen from UAN fertilizers is a major problem, it is merely a part of the larger problem of inefficiencies in the delivery of all types of fertilizers. Many fertilizers are routinely applied in ways that do not optimally deliver the fertilizer to the crops. Not only does this represent an economic loss to the farmer, it often results in the fertilizer entering bodies of water and causing environmental problems.

The 360 Yield Center of Morton, Ill. manufactures and sells the 360 Y-DROP liquid fertilizer application system. The system reduces nitrogen losses and gets more of the applied nitrogen to the plant root systems. As shown in FIGS. 1 and 2, the system consists of multiple bullet shaped units that are suspended from an overhead toolbar and that pass down the rows about two feet above the ground. A hose extends outwardly and downwardly from each unit so that the ends (outlets) of the hoses drag along the ground in contact with the plants on either side. The liquid fertilizer is thus applied directly onto the bases of the plants.

Although the 360 Y-DROP system is an improvement, excessive amounts of nitrogen continue to be lost. Accordingly, there is a demand for an improved apparatus and an improved method for applying fertilizers directly to the bases of growing plants in two adjacent rows that reduces losses.

SUMMARY OF THE INVENTION

The general object of this invention is to provide an improved apparatus and an improved method for applying fertilizers directly to the bases of growing plants in two adjacent rows that reduces losses.

I have invented an improved apparatus for attaching to a transverse toolbar passing over a field of growing plants with bases in spaced apart rows and for applying a fertilizer to the bases of the growing plants in two adjacent rows. The apparatus comprises: (a) at least one vertical member adapted for descending from the transverse toolbar, the vertical member being adapted for positioning between the rows of growing plants; (b) at least one application line for each vertical member for applying a fertilizer between the rows of the growing crops or to the bases of the growing plants in adjacent rows; and (c) a dirt moving member at the bottom of each vertical member for moving dirt and any applied fertilizer from between the rows onto the bases of the growing plants in adjacent rows.

I have also invented an improved method for applying fertilizer to the bases of growing plants in two adjacent rows. The method comprises: (a) obtaining an apparatus comprising: (i) a transverse bar for passing over a field of growing plants in spaced apart rows; (ii) a plurality of vertical members descending from the transverse bar, the vertical members being positioned between the rows of growing plants; (iii) at least one application line for applying a fertilizer between the rows of growing plants or to the bases of the growing plants in adjacent rows; and (iv) a dirt moving member at the bottom of each vertical member for moving dirt and any applied fertilizer between the adjacent rows onto the bases of the growing plants in adjacent rows; and (b) pulling the apparatus through a field of growing plants while applying fertilizer between the rows of growing plants or to the bases of the growing plants in adjacent rows and then immediately moving dirt and any applied fertilizer between the rows onto the bases of the growing plants in adjacent rows.

Applying a fertilizer sealed with dirt directly to the bases of growing plants in two adjacent rows seals the fertilizer and thereby significantly decreases losses.

BRIEF DESCRIPTION OF THE DRAWINGS

FIG. 14 is a perspective view thereof in use moving between two rows of growing plants and applying a fertilizer between the rows.

DETAILED DESCRIPTION OF THE INVENTION

1. The Preferred Embodiment

Figure 1:
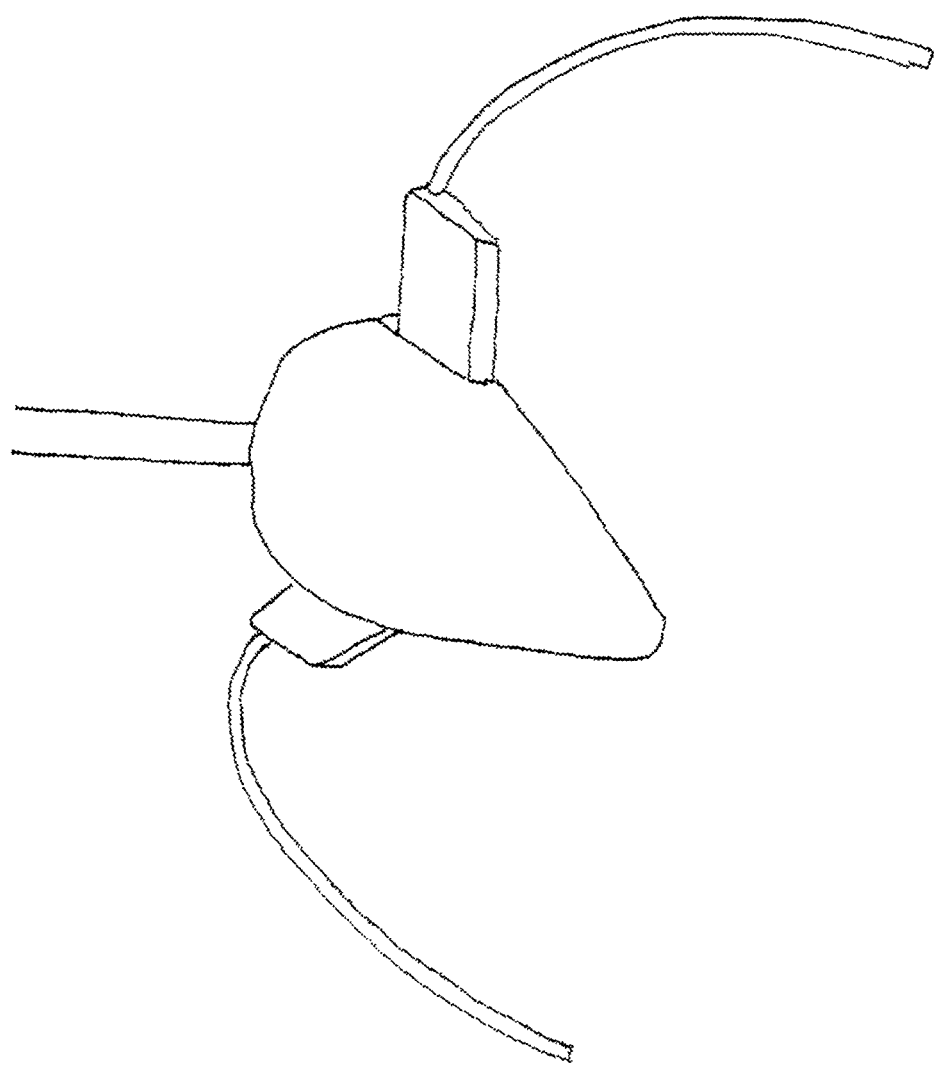
FIG. 1 is a front perspective view of a prior art apparatus for applying liquid fertilizer.
Figure 2:
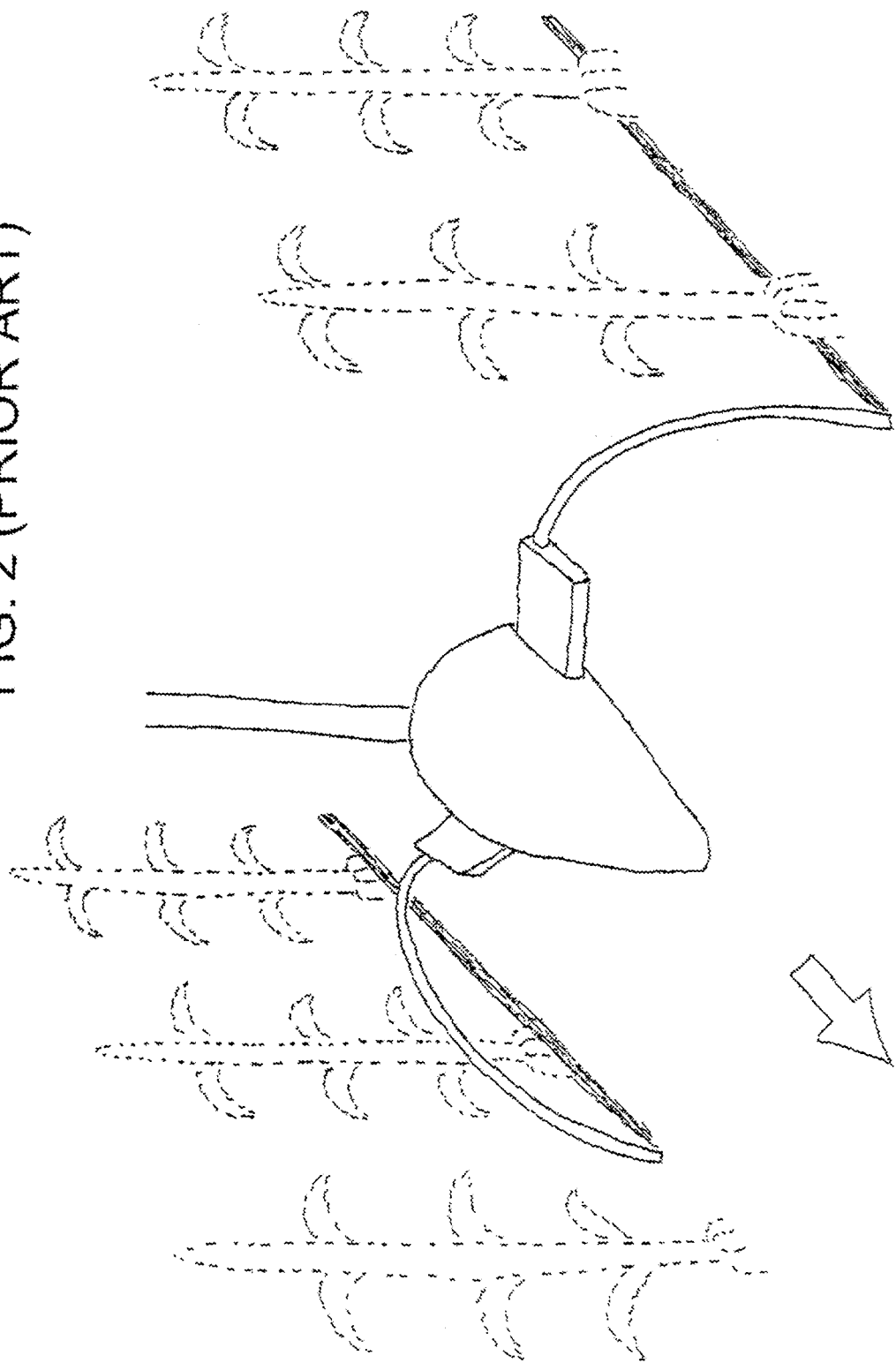
FIG. 2 is a perspective view thereof in use moving between two rows of growing plants.
Figure 3:
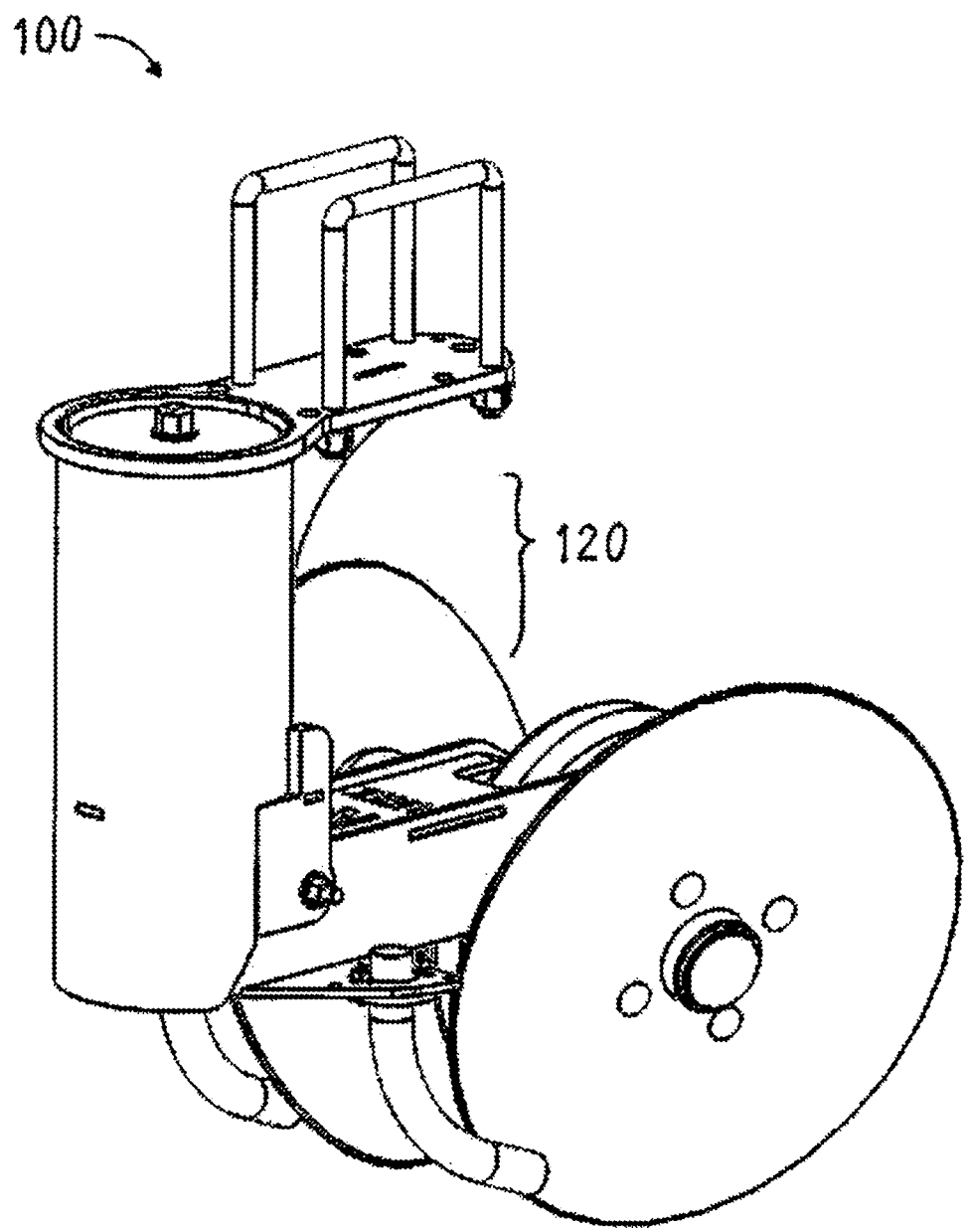
FIG. 3 is a front perspective view of a preferred embodiment of the fertilizer application apparatus of this invention.

This invention is best understood by reference to the drawings. Referring first to FIGS. 3 to 12, a preferred embodiment of the apparatus 100 of this invention is adapted for attachment to a transverse bar 110 for passing over a field of growing plants in spaced apart rows. The transverse bar is commonly known as a toolbar and is a conventional piece of farm equipment. The transverse bar is typically supported by a plurality of wheels (not shown). The transverse bar typically contains a coupler (not shown) for connection to a towing tractor or other vehicle. The transverse bar commonly extends over twenty or more rows.

Attached to and descending from the transverse bar are a plurality of generally vertical members 120 that carry at least one fertilizer application line and at least one dirt moving member. In FIGS. 3 to 12, only one vertical member is shown for illustration purposes. The vertical members are spaced apart on the transverse bar so they are positioned in the spaces between the rows of growing crops in the field. In the preferred embodiment, the vertical member comprises a vertical arm 130, a trailing arm 140, and a shock absorber 150.

Each vertical arm 130 comprises a cylinder 131 attached to the transverse bar with a bracket 132 that extends rearwardly from the top of the cylinder. Each bracket comprises a horizontal tab 133 and two U-shaped bolts 134. The vertical arm has two rearwardly extending vertical brackets 135 at its bottom for attachment of the trailing arm. The cylinder contains an internal shock absorber as discussed below.

Pivotably attached to each vertical arm is a trailing arm 140. In the preferred embodiment, the trailing arm is attached at the two vertical brackets of the vertical arm with fasteners that allow the trailing arm to pivot. At its front end, the trailing arm has two horizontal brackets 141 for attachment of curved tubes as described below. The horizontal brackets preferably include slots that enable the position of the curved tubes to be varied. At its rear end, the trailing arm has a bracket 142 for attachment of a depth wheel and two spindles 143 for attachment of two colters as described below. The bracket preferably includes attachment slots that enable the depth wheel shaft to be varied in position. Variation of the depth wheel varies the depth of the colters. The bracket also preferably includes attachment slots that enable the angle of the spindles to be varied in position.

Figure 6:
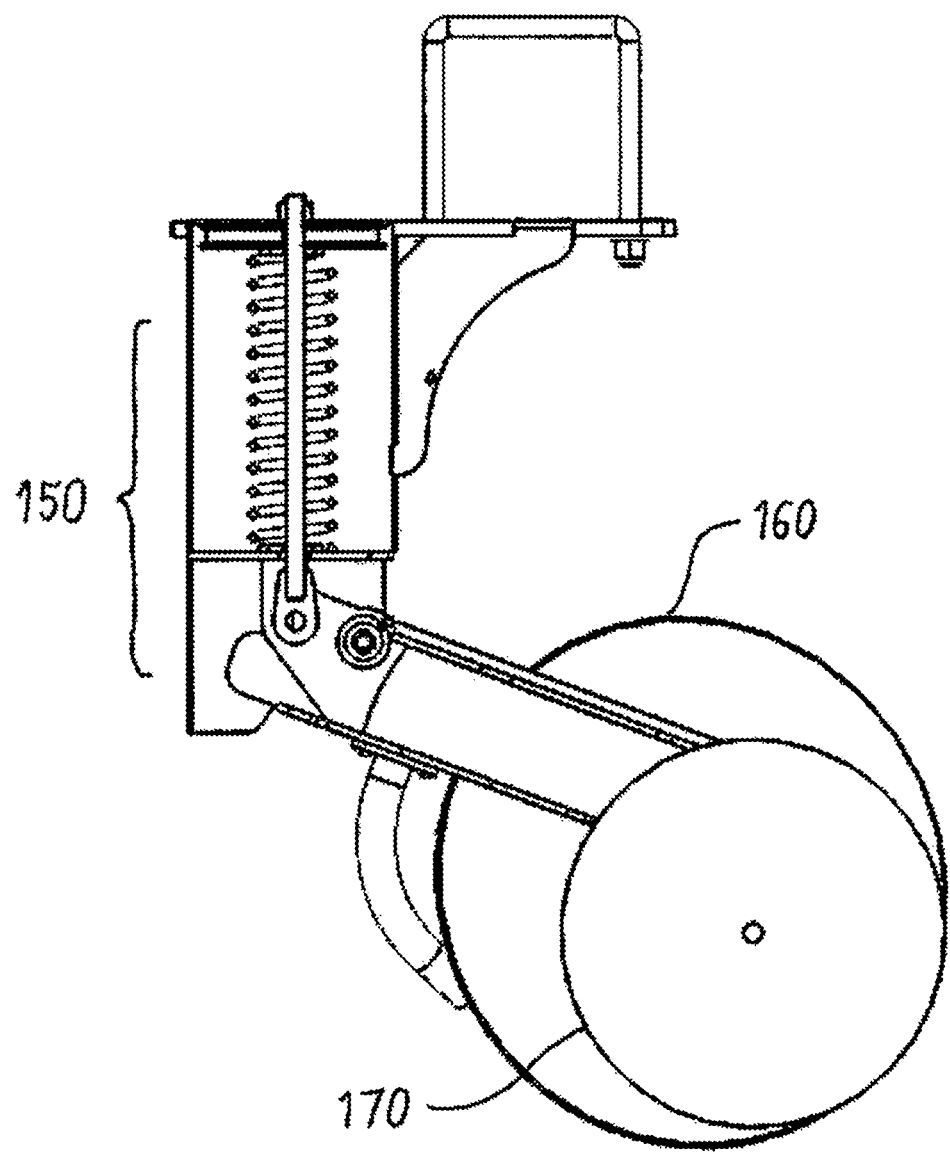
FIG. 6 is a side elevation view thereof partially in section with the trailing arm in a first position.
Figure 7:
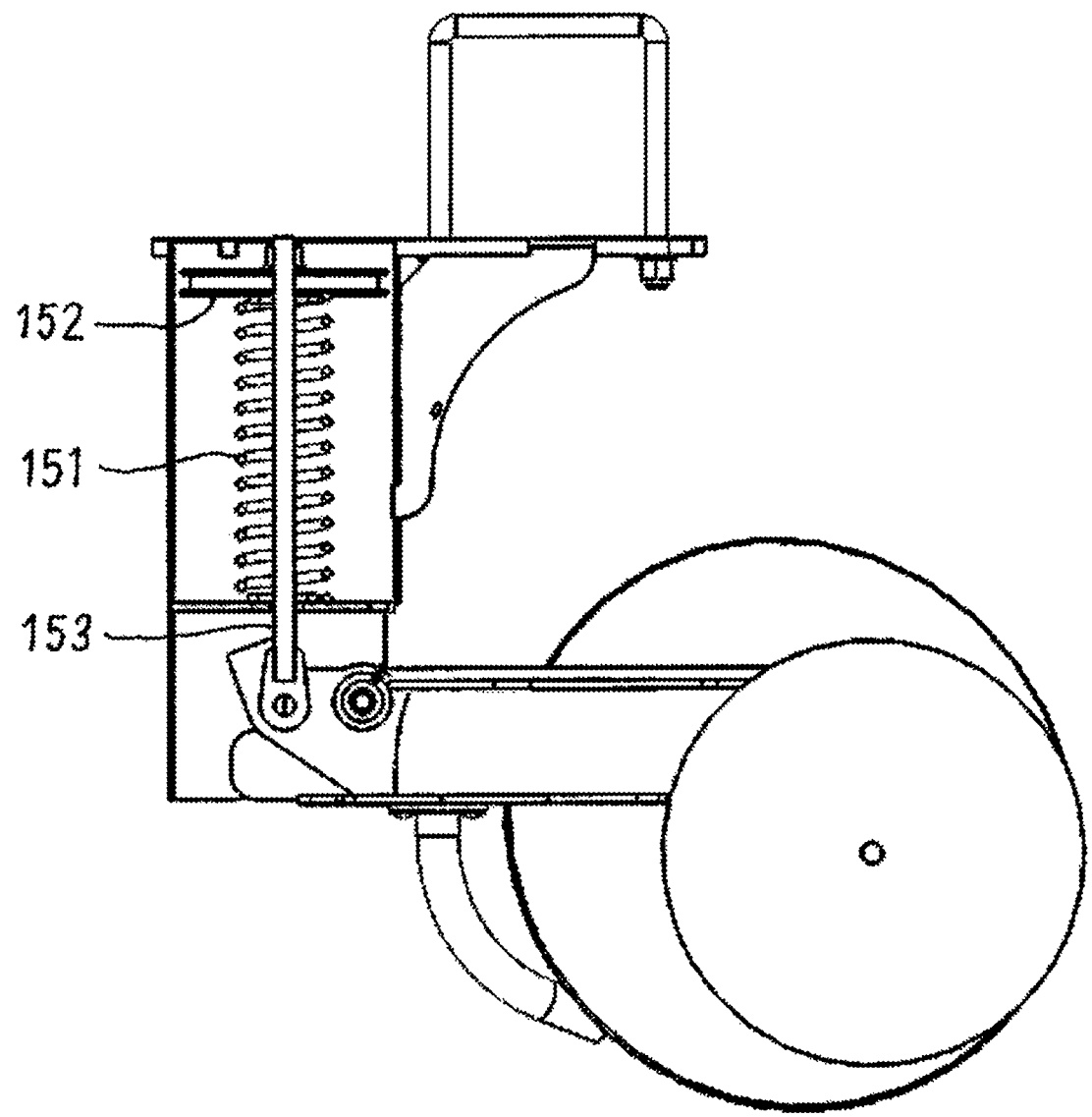
FIG. 7 is a side elevation view thereof partially in section with the trailing arm in a second position.
Figure 8:
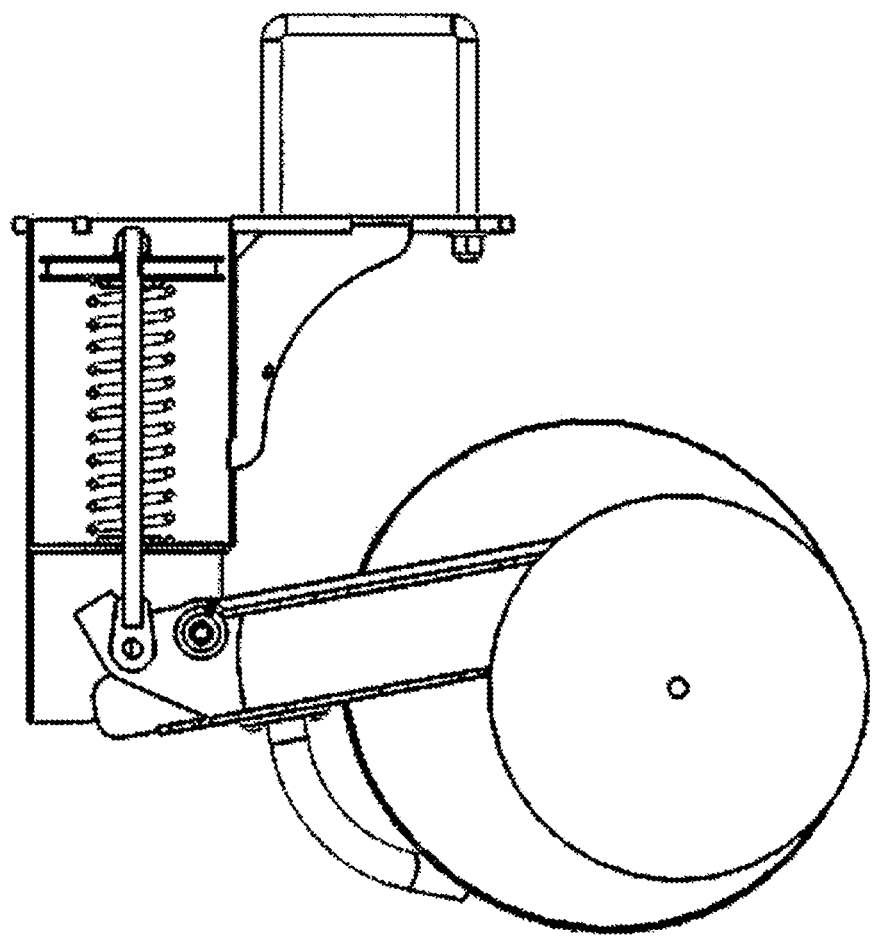
FIG. 8 is a side elevation view thereof partially in section with the trailing arm in a third position.
Figure 9:
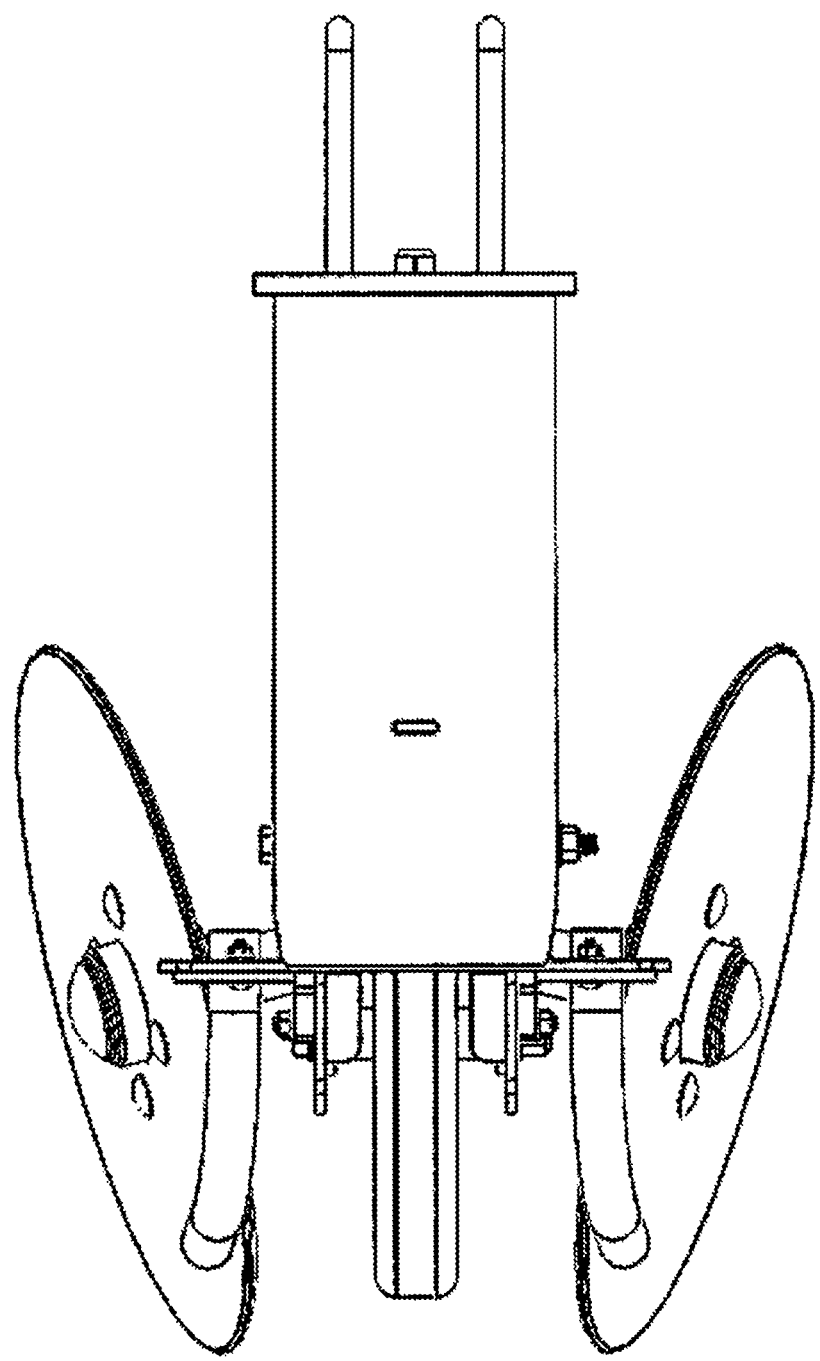
FIG. 9 is a front elevation view thereof.
Figure 10:
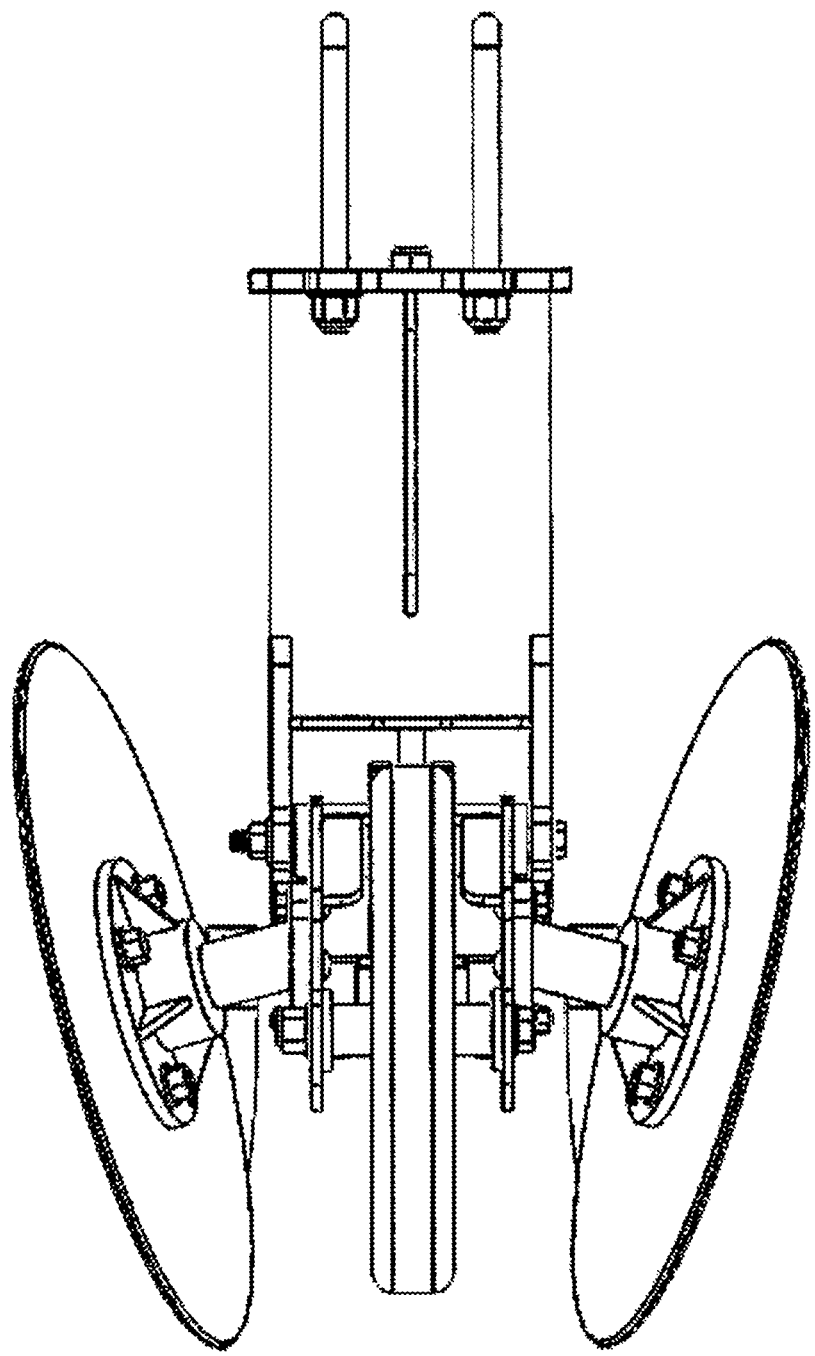
FIG. 10 is a rear elevation view thereof.

A shock absorber 150 is preferably positioned between the vertical arm and the trailing arm to provide a downward force upon the trailing arm while absorbing and dampening upward movement as the trailing arm encounters bumps in the field. In the preferred embodiment, the shock absorber comprises a coil spring 151, a movable circular top plate 152, and a fixed length rod 153 within the vertical arm as seen in FIGS. 6 to 8. The top of the coil spring is attached to the top plate. The top of the rod is attached to the top plate and the bottom of the rod is attached to the trailing arm. When the top plate is at its highest position and the coil spring is at its greatest extension, the trailing arm is angled below the horizontal as shown in FIG. 6. When the trailing arm moves upwardly to the horizontal position, the top plate is pulled downwardly by the rod and the coil spring compresses as shown in FIG. 7. When the trailing arm moves upwardly above the horizontal position, the top plate is pulled downwardly further and the coil spring compresses further as shown in FIG. 8. Other types of shock absorbers, including those of the mechanical, pneumatic, and hydraulic types, are well known in the industry and are suitable.

Attached to the spindles at the rear of each trailing arm are two freely rotating colters 160. The colters are preferably cambered outwardly to direct the dirt outwardly, toward the growing crops. The colters are flat or slightly bowl shaped (concave on the inner side and convex on the outer side). The colters pierce the ground to a depth of about an inch. The exact depth to which the colters pierce the ground is determined by the position of the freely rotating depth wheel 170 attached at the rear of each trailing arm. In FIGS. 5 to 8, one colter is omitted to show the depth wheel.

Figure 4:
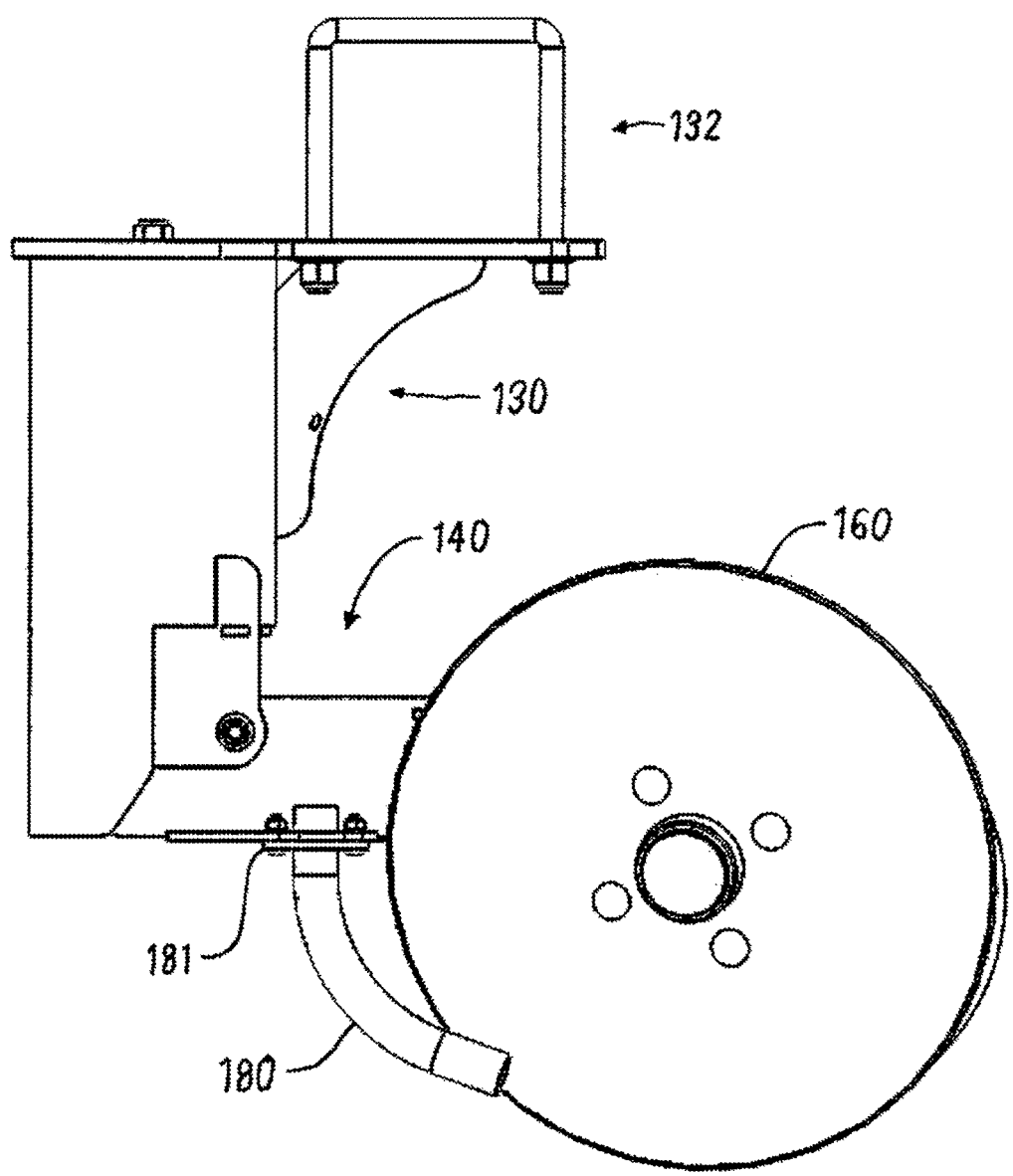
FIG. 4 is a side elevation view thereof.
Figure 5:
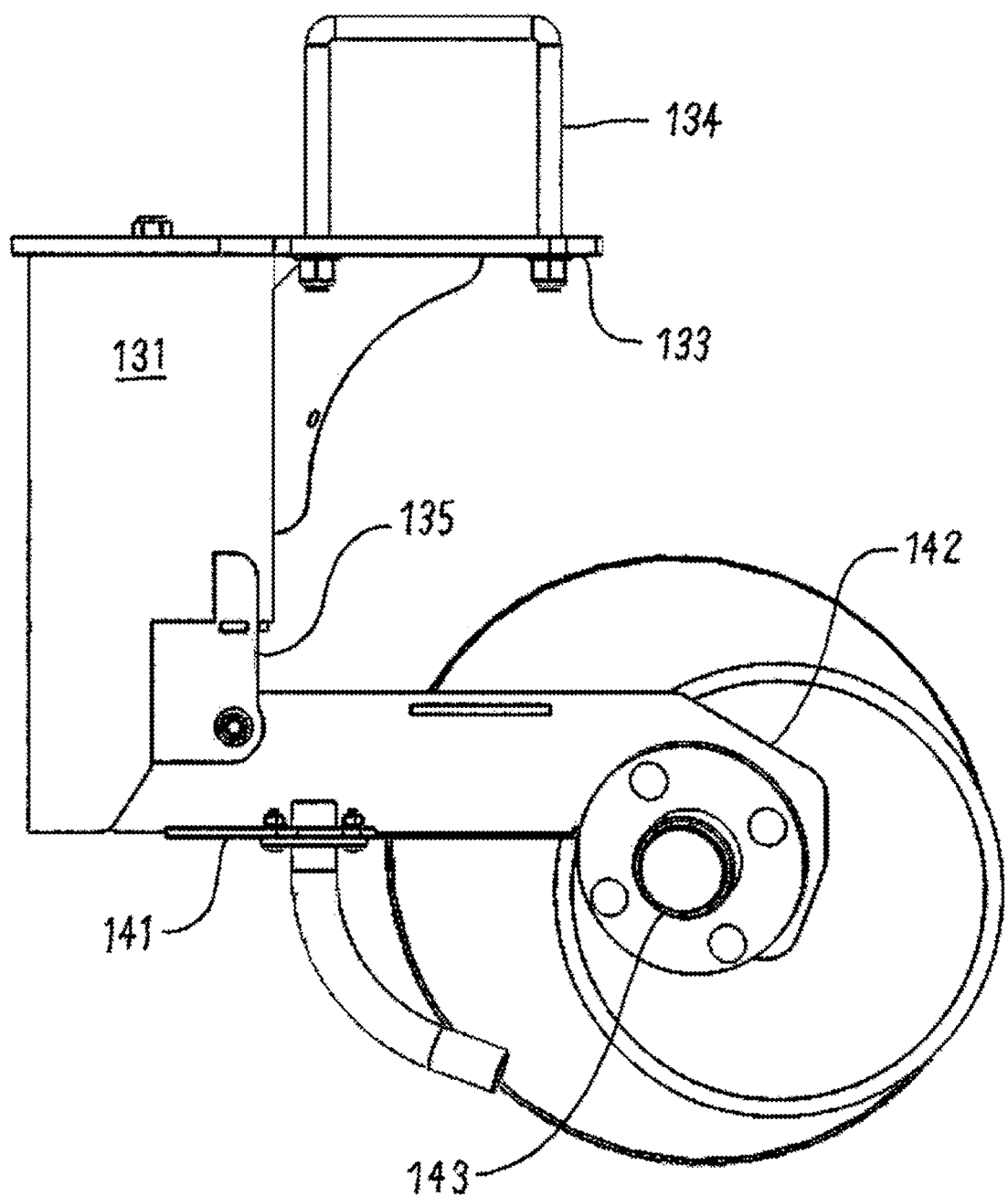
FIG. 5 is a side elevation view thereof with one colter removed for illustration purposes.
Figure 11:
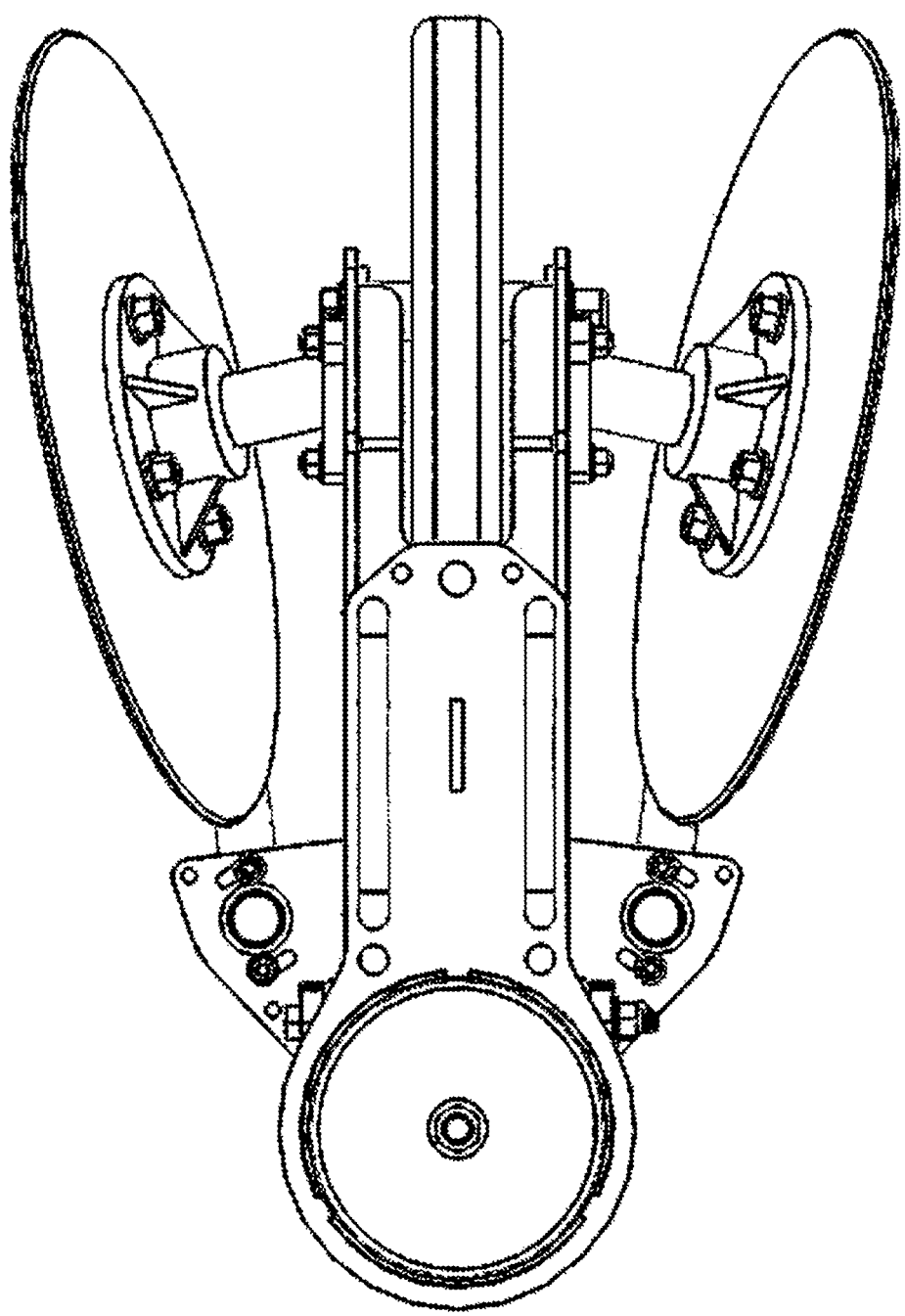
FIG. 11 is a top plan view thereof.

Attached to each horizontal bracket of the trailing arm is a curved tube 180 that is swiveled and secured into the desired orientation. As seen in FIGS. 4 and 11, the upper portions of the curved tubes preferably include horizontal flanges 181 that are secured at the desired position in attachment slots in the horizontal brackets of the trailing arm. The curved tubes are made of a relatively rigid material, such as a thermoplastic or metal. The curved tubes serve two different functions, depending on whether a solid or a liquid fertilizer is being applied. If a solid fertilizer is being applied, the fertilizer is routed to the curved tubes and flows through them to the desired location. If a liquid fertilizer is being applied, a flexible liquid tube is routed through the rigid curved tube. The curved tube thus protects the liquid tube and guides it to the desired location. The flexible tubes that carry liquid fertilizer through the rigid curved tubes are not shown for clarity. Similarly, tubes that carry solid fertilizer to the rigid curved tubes are not shown.

2. Use of the Preferred Embodiment

Figure 12:
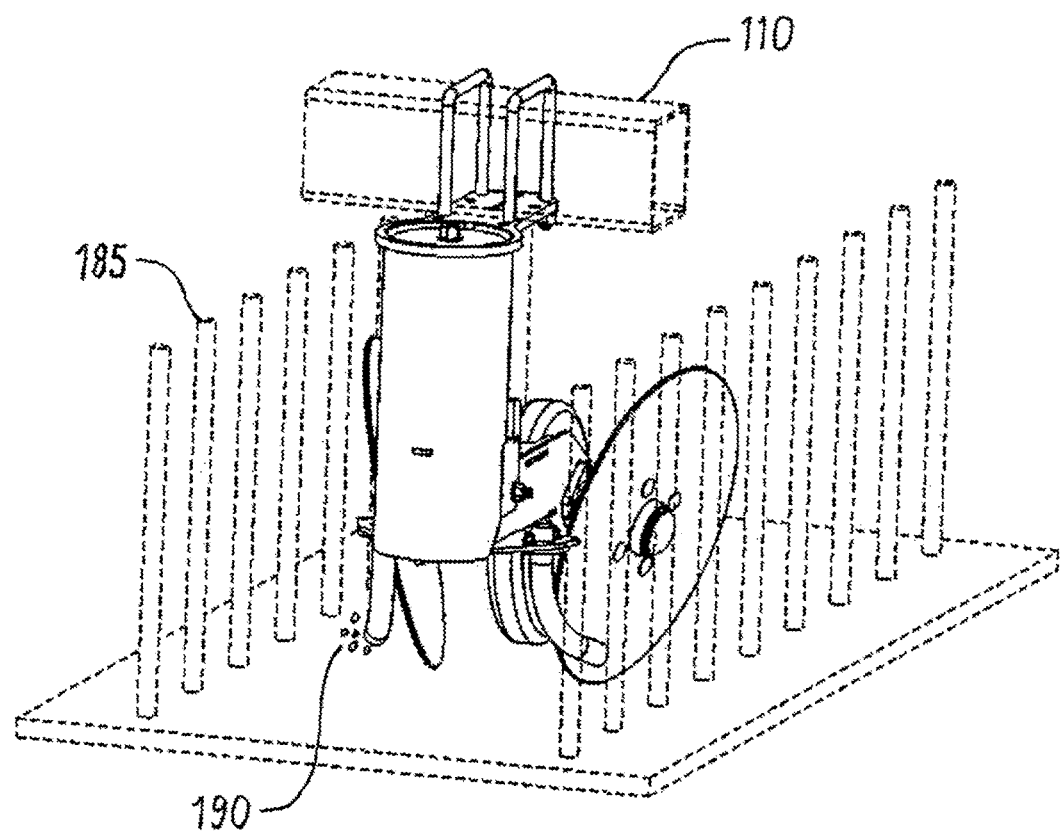
FIG. 12 is a perspective view thereof in use moving between two rows of growing plants and applying a fertilizer between the rows.

The use of the preferred embodiment of the apparatus can now be considered. Referring now to FIG. 12, the apparatus is pulled through a field of growing plants 185 and a fertilizer 190 is applied at the desired rate. The apparatus passes through the space between the rows of growing crops. If a solid fertilizer is applied, it is fed from one or more bins into the rigid curved tubes. The curved tubes are swiveled to apply the fertilizer at the desired location, either along the bases of the growing crops or in the space between the rows of growing crops. In the former case, the colters then move dirt onto the fertilizer and the bases of the growing crops. In the latter case, the colters move a combination of dirt and fertilizer onto the bases of the growing crops. The toolbar 110 is shown in phantom lines. The growing crops are represented by vertical poles (cylinders) shown in phantom lines and the ground is represented by a thin platform shown in phantom lines. The lines carrying fertilizer from the reservoir or hopper to the apparatus are omitted for clarity.

If a liquid fertilizer is applied, it is fed from one or more reservoirs into the vertical cylinders and then through liquid tubes that are routed inside the rigid curved tubes. As with solid fertilizers, liquid fertilizers are applied at the desired location, either along the bases of the growing crops or in the space between the rows of growing crops. In the former case, the colters then move dirt onto the fertilizer and the bases of the growing crops. In the latter case, the colters move a combination of dirt and fertilizer onto the bases of the growing crops. In either case, the dirt provides an immediate seal and thereby decreases losses.

Losses are decreased due for several reasons. Volatilization losses are decreased because of the sealing provided by the dirt. Losses due to leaching and runoff are also decreased because the fertilizer is mixed with dirt at the bases of the growing plants. While the applicator apparatus of this invention is especially useful in the application of UAN fertilizers, it is also useful in applying a wide variety of liquid and solid fertilizers to a wide variety of crops in a wide variety of conditions.

3. The Second Embodiment

Figure 13:
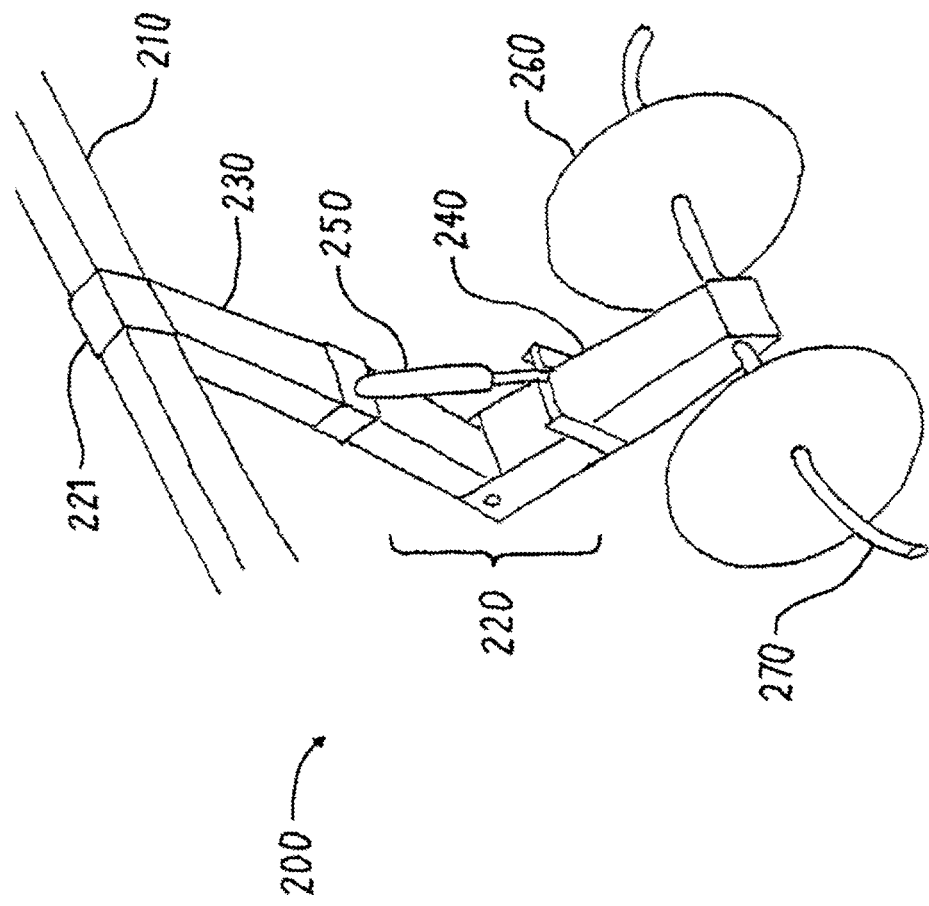
FIG. 13 is a rear perspective view of a second embodiment of the liquid fertilizer application apparatus of this invention.

Referring now to FIG. 13, a second embodiment of the apparatus 200 of this invention is shown attached to a transverse bar 210 for passing over a field of growing plants in spaced apart rows.

Attached to and descending from the transverse bar are a plurality of generally vertical members 220. In FIG. 13, only one vertical member is shown for illustration purposes. The vertical member is attached to the transverse bar with a bracket 221. The vertical members are spaced apart on the transverse bar so they are positioned in the spaces between the rows of growing crops in the field. In the preferred embodiment, the vertical member comprises a vertical arm 230, a trailing arm 240, and a shock absorber 250.

The vertical arm is a square tube and is angled slightly forward. Pivotably attached to each vertical arm is a trailing arm. In the preferred embodiment, the trailing arm is also a square tube that is angled to the rear at about 45 degrees to the horizontal. A shock absorber is preferably positioned between the vertical arm and the trailing arm to provide a constant downward force upon the trailing arm while allowing upward movement as the trailing arm encounters bumps in the field.

Attached to the rear of each trailing arm are two freely rotating colters 260. The colters are preferably cambered outwardly and slightly bowl shaped (concave on the inner side and convex on the outer side). The colters pierce the ground to a depth of about an inch and throw dirt outwardly. The depth to which the colters pierce the ground is controlled by the addition of a depth wheel (not shown) if desired.

Application lines 270 for applying a liquid fertilizer to the bases of the growing plants in adjacent rows are routed through the center of each of the colters. The application lines are connected to supply lines contained within or attached to the horizontal member and the trailing arm. The supply lines are not shown for clarity. The supply lines are, in turn, connected to a reservoir of liquid fertilizer. The application lines extend outwardly form the colters so that they contact the growing plants in adjacent rows. The lines are hoses, tubes, nozzles, or other delivery systems.

4. Use of the Second Embodiment

The use of the second embodiment of the apparatus can now be considered. Referring now to FIG. 14, the apparatus is pulled through a field of growing plants 285. Liquid fertilizer 290 from a reservoir is fed at the desired rate to each pair of application lines between rows. The liquid pours out the lines at the bases of the growing plants. The colters immediately move dirt onto the liquid to provide an immediate seal and thereby decrease losses.

5. Additional Embodiments

Many variations of the apparatus and method are suitable in addition to those already discussed. As one example, two colters are the preferred dirt moving members. However, a single colter, a plow shaped wedge, and the like are also suitable. As a second example, the colter or colters can be fixed in position or adjustable in camber and or separation. Adjustability enables the dirt to be thrown precisely on the applied fertilizer, regardless of distance between rows or speed of the towing vehicle. As a third example, a visual means to ensure precise coverage, such as a video monitor, enables coverage to be confirmed without having to stop the towing vehicle and physically inspecting the rows. As a fourth example, a vertical member comprising a vertical arm, a pivoting trailing arm, and a shock absorber is preferred, but a single vertical member that pivots at the transverse bar is also suitable.

I claim:

1. An apparatus for attaching to a transverse toolbar passing over a field of growing plants with bases in spaced apart rows and for applying a fertilizer to the bases of the growing plants in an adjacent row, the apparatus comprising:

(a) a vertical member adapted for descending from the transverse toolbar, the vertical member being adapted for positioning between the rows of growing plants, the vertical member being adapted for passing over a field in a single direction only, which direction defines forward and rearward;

(b) an application line for the vertical member for applying a fertilizer between the rows of the growing crops or to the bases of the growing plants in an adjacent row; and (c) a dirt moving member at the bottom of the vertical member for moving dirt and any applied fertilizer between the rows from between the rows outwardly onto the bases of the growing plants in an adjacent row, the dirt moving member being located rearwardly of the application line.

2. The apparatus of claim 1 wherein the vertical member comprises a vertical arm connected to the transverse toolbar, a trailing arm pivotably connected to the vertical arm, and a shock absorber extending between the vertical arm and the trailing arm.

3. The apparatus of claim 2 wherein the dirt moving member comprises two freely rotating colters that are cambered outwardly.

4. The apparatus of claim 3 wherein the application line passes through the vertical arm.

5. The apparatus of claim 4 wherein the application line passes through a colter.

6. A method for applying a fertilizer directly to the bases of growing plants in two adjacent rows, the method comprising:

(a) obtaining an apparatus comprising: (i) a transverse bar for passing over a field of growing plants in spaced apart rows in a forward direction; (ii) a vertical member descending from the transverse bar, the vertical member being positioned between the rows of growing plants; (iii) an application line for applying a fertilizer between the rows of growing plants or to the bases of the growing plants in an adjacent row; and (iv) a dirt moving member at the bottom of the vertical member and rearwardly of the application line for moving dirt and any fertilizer applied between the rows from between the rows outwardly onto the bases of the growing plants in an adjacent row; and (b) pulling the apparatus through a field of growing plants while applying fertilizer between the rows of growing plants or to the bases of the growing plants in an adjacent row and then immediately moving dirt and any fertilizer applied between the rows from between the rows outwardly onto the bases of the growing plants in an adjacent row.

7. The method of claim 6 wherein the vertical member of the apparatus comprises a vertical arm pivotably connected to the transverse bar, a trailing arm pivotably connected to the vertical arm, and a shock absorber extending between the vertical arm and the trailing arm.

8. The method of claim 7 wherein the dirt moving member of the apparatus comprises two freely rotating colters that are cambered outwardly.

9. The method of claim 8 wherein the application line passes through the vertical arm.

10. The method of claim 9 wherein the application line passes through a colter.

* * * * *